Jan. 2, 1945.        H. OSTERBERG        2,366,687
MEANS FOR DECREASING LIGHT REFLECTION FROM SURFACES
Filed Jan. 23, 1941
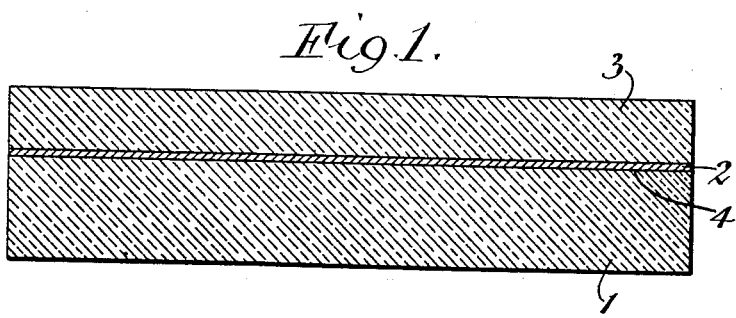
INVENTOR
HAROLD OSTERBERG
BY
ATTORNEY Patented Jan. 2, 1945

2,366,687

UNITED STATES PATENT OFFICE 2,366,687

MEANS FOR DECREASING LIGHT REFLECTION FROM SURFACES

Harold Osterberg, Buffalo, N. Y., assignor to Spencer Lens Company, Buffalo, N. Y., a corporation of New York Application January 23, 1941, Serial No. 375,588

4 Claims. (Cl. 88—1)

This invention relates to a new and improved means for substantially eliminating light reflections from the surfaces of elements of glass, plastic or resinous composition or other material having reflective surfaces.

An object of the invention is to provide new and improced means for substantially eliminating glare and reflection from the surfaces of articles and which will more effectively eliminate said glare and reflection and greatly facilitate and reduce the cost of manufacture of articles embodying the same.

Another object of the invention is to provide a new and improved means for substantially eliminating light reflections from the surfaces of articles which will form a hard and durable surface on the articles treated.

Another object of the invention is to provide means of the type set forth which will allow the same coating of a hard material to be employed regardless of the refractive index of the material of which the article is formed.

Another object of the invention is to provide a means of the type set forth which will greatly increase the manufacturing tolerances and thereby considerably decrease manufacturing costs without sacrificing the quality of the resultant product.

Other objects and advantages of the invention will be apparent from the following description taken in connection with the accompanying drawing and it will be understood that many changes may be made in the details of construction, arrangement of parts and steps of the process without departing from the scope of the invention as expressed in the accompanying claims.

Referring to the drawing:

Fig. 1 is a greatly enlarged cross sectional view of an article treated by the herein disclosed method.

There has recently been published a method of decreasing the reflection of light from the surfaces of light transmitting articles. This is set forth in Patent Number 2,207,656, granted July 9, 1940, to Cartwright and Turner, which disclosed the coating of light transmitting articles with a coating of a dielectric material whose refractive index satisfies the condition for zero reflecting power.

While this process has been found satisfactory in the case of certain materials, various materials require different coatings and it has been found difficult to locate dielectric materials whose refractive index satisfies the condition for maximum elimination of reflection with various types of materials. Due to the fact that various materials to be treated had different refractive indices, it was necessary to use different coating materials for the articles of different refractive index. In some cases it was not possible to find a material having a suitable refractive index and in such cases it was necessary to compromise and use the coating material having the index of refraction closest to that desired, which might not give the maximum elimination of reflection.

Also, in the manufacture of devices under the process disclosed by the above patent, it was necessary that the thickness of the coating layer be very accurately controlled. This added difficulties and increased the cost of manufacturing articles employing such process. Also this method did not allow the use of materials to give a hard coating.

There has also been devised a method of decreasing the reflection of light from surfaces by first applying a coating of an oxide such as aluminum oxide, iron oxide or the like on the article and then coating over the oxide coating with a coating of a material such as quartz.

This method did not provide the same elimination of reflection for all materials treated, and the results varied according to the material. Also, with such process it was necessary that the thickness of both the oxide layer and the outer coating be very accurately controlled in order to obtain maximum elimination of reflection. Because of the careful control necessary, this method is expensive and difficult to manufacture.

It is therefore one of the primary objects of the present invention to provide new and improved means and method of treating the surface of articles to produce a hard surface and substantially eliminate the reflection of light from the surfaces thereof by placing thereon coatings of materials which may be used for elements of various indices of refraction and which also provides considerable tolerance in the thickness of the layers and thereby overcomes the production difficulties present with the prior types.

The present means and method is particularly adapted for use where the elimination of reflections is the primary object such as ophthalmic lenses, optical filters, pilot cockpit for airplanes, store or exhibit windows, various camera lenses, second surface reflectors and many optical instruments.

Referring more particularly to the drawing, the device shown embodying the invention comprises the base member 1, first coating 2 and second coating 3.

The base 1 may be of glass, plastic, resin or other light transmitting or reflective material having a reflective surface 4 which interferes with the use of the article and the reflections from which surface it is desired to eliminate.

The first coating 2 on the member 1 is a very thin layer of highly reflecting material, preferably a metal. By this means, reflecting power is artificially added to the surface of member 1. The required additional reflecting power is slight. Consequently a thin metal layer of negligible optical thickness suffices. The light transmission of this thin metallic layer will be high and may be increased by selecting the metal with the highest light transmission for the visible region or for the wave band for which minimum reflection and maximum light transmission are desired. This coating or layer 2, while reflective, is of necessity very thin as stated above and consequently does not substantially interfere with the light transmission of article 1. In fact, in some instances it has been found possible to increase the resultant light transmission when the layer 3 as hereinafter described is added over the layer 2. The optical thickness of said layer 2 is preferably of approximately one-twenty-fifth of a wave length of light although experiments have indicated that there may be considerable tolerance in the optical thickness of such layer which will be satisfactory; for example, the optical thickness may be from one one-hundredth to one-tenth of a wave length of light.

The material of which said layer 2 is formed, is preferably a metal having the necessary reflecting properties but which possesses a low coefficient of absorption. Metals which could be used are copper, silver, rhodium, aluminum or any stable metal which has high reflecting properties but does not have an unduly high coefficient of absorption.

This metallic layer 2 can be formed on the surface 4 of the member 1 by evaporating the coating substance in the vicinity of said surface 4 while the surface and substance are maintained in a substantial vacuum in a manner similar to that set forth in Patent Number 767,216 to Thomas A. Edison. That is, the surface of the article to be coated is cleaned and the article and a quantity of the coating substance are placed a suitable distance apart in an evacuable chamber and the chamber is then evacuated to a suitable degree and maintained in that degree of evacuation and the solid coating substance heated by an electrical heating element or the like located within the chamber to a temperature sufficient to vaporize the coating. The vaporizing substance passes through the chamber and condenses as a film or layer on the surface 4 of the article 1.

Although the evaporation process set forth above has been found satisfactory for forming said coating 2, the said coating may be applied by other methods such as by the sputtering of the metal from a cathode in a glow discharge device. The member to be coated, an electrode and the cathode are placed in a vacuum, and a glow discharge is formed between the electrode and cathode. During this glow discharge there will be a sputtering or discharge of fine particles of the metal from the cathode and the metallic particles so thrown off by the cathode will be deposited on the surface of the article 1 in the form of the coating or layer 2, the density of which may be regulated to some extent in a manner well known by the art, such as by duration of the operation or by regulation of the current.

If desired, the coated article may then be heated to a temperature which is usually less than the softening or fusing point of either the article 1 or coating 2 to harden and to permanently fix the coating 2 on the surface 4.

Over the metal layer or coating 2 is placed another coating 3 of a material which will produce a hard surface or finish on the article and which will substantially reduce reflections from the surface of the article.

This coating 3 may be of quartz, beryl, albite, corundum or other suitable material. This outer coating 3 is preferably of a hard substance to provide a damage or scratch resisting surface to the article and should have as low melting and boiling points as possible in order that cemented doublets or the like may be treated without being overheated by radiation from the material which is being evaporated. For this reason albite has been found desirable as it is hard and boils at a relatively low temperature.

The said coating 3 is preferably applied by the evaporation method described above for the middle layer 2, and the optical thickness or path of said coating 3 is preferably from approximately one-eighth to three-quarters of a wave length of light, although a coating having an optical thickness of about three-eighths of a wave length has been found very satisfactory where the middle or reflective layer 2 was of rhodium.

The reason that the optical thickness of the coating 3 is not preferably, as stated in the prior art, exactly one-fourth or an odd number of fourths of the wave length of light for which the reflecting power is minimized is that the phase difference introduced by reflection at the very thin metallic coating 2 depends upon the thickness of the said coating 2 and is markedly different from the one-half wave length phase change introduced by reflection in the case where the light moves from a dielectric of a low index of refraction to a dielectric of a higher index of refraction.

It is noted that the phase change introduced by reflection at the thin metallic coating 2 is variable by varying the thickness of said coating 2. Compensating thickness variation may thus be introduced into the coating 3 so that the light reflected from the outer surface of the coating 3 is one-half wave length out of phase with the interfering light beam which is reflected back through the coating 3 from the metallic coating 2.

I have found that for wide variations in thickness of the thin metal coat 2 corresponding compensating variations in thickness of coat 3 will produce uniformly low reflecting power.

It is pointed out that when the process set forth in this application is employed, if the reflective metal layer 2 should be made slightly thinner or slightly thicker than predetermined, this thinness or thickness can be compensated for by varying the thickness of the outer layer 3. It will be apparent that because of this range of thickness of the layers, there is provided a much wider range of tolerance than has been possible with prior methods in addition to superior reflection elimination over the prior art.

Because of the comparatively wide tolerances in the thickness of the layers and the fact that it is possible to compensate in the outer coating for variations in thickness of the first coating when the process set forth herein is employed, there is accordingly considerably greater ease of production and reduction of cost of the treating of articles to substantially eliminate surface reflections over prior methods.

From the above it will be seen that I have provided simple, efficient and economical means for obtaining all of the objects and advantages of the invention.

Having described my invention, I claim:

1. A transparent, light transmitting article having a surface normally paritally light reflective and means for reducing the light reflectance of said surface without substantially interfering with the light transmission of said article comprising a thin transparent metallic coating on said surface whereby the reflecting power of said surface is increased as compared with the uncoated surface of said article, the optical thickness of said metallic reflective coating being not more than one-tenth of a wave length of light, the thickness and absorption of said transparent metallic reflective coating being such as not to substantially interfere with the light transmission of said article, and a transparent second coating over the surface of said metallic reflective coating, said second coating having an optical thickness of from approximately one-eighth to approximately three-quarters of a wave length of light with the thickness of said second coating depending upon the metal and thickness of which said metallic reflective coating is formed, said metallic reflective coating having a negligible optical path as compared with the optical path of said second coating and said second coating being of a non-metallic material and of a thickness to cooperatively function with said metallic reflective coating to thereby reduce the light reflection from said surface.

2. A transparent, light transmitting article having a surface normally partially light reflective and means for reducing the light reflectance of said surface without substantially interfering with the light transmission of said article comprising a thin transparent metallic coating on said surface whereby the reflecting power of said surface is increased as compared with the uncoated surface of said article, the optical thickness of said metallic reflective coating being not more than approximately one-twenty-fifth of a wave length of light, the thickness and absorption of said transparent metallic reflective coating being such as not to substantially interfere with the light transmission of said article, and a transparent second coating over the surface of said metallic reflective coating, said second coating having an optical thickness of from approximately one-eighth to approximately three-quarters of a wave length of light with the thickness of said second coating depending upon the metal and thickness of which said metallic reflective coating is formed, said metallic reflective coating having a negligible optical path as compared with the optical path of said second coating and said second coating being of a non-metallic material and of a thickness to cooperatively function with said metallic reflective coating to thereby reduce the light reflection from said surface.

3. A transparent, light transmitting article having a surface normally partially light reflective and means for reducing the light reflectance of said surface without substantially interfering with the light transmission of said article comprising a thin transparent metallic coating on said surface whereby the reflecting power of said surface is increased as compared with the uncoated surface of said article, the optical thickness of said metallic reflective coating being between approximately one-tenth and approximately one one-hundredth of a wave length of light, the thickness and absorption of said transparent metallic reflective coating being such as not to substantially interfere with the light transmission of said article, and a transparent second coating over the surface of said metallic reflective coating, said second coating having an optical thickness of from approximately one-eighth to approximately three-quarters of a wave length of light with the thickness of said second coating depending upon the metal and thickness of which said metallic reflective coating is formed, said metallic reflective coating having a negligible optical path as compared with the optical path of said second coating and said second coating being of a non-metallic material and of a thickness to cooperatively function with said metallic reflective coating to thereby reduce the light reflection from said surface.

4. A transparent, light transmitting article having a surface normally partially light reflective and means for reducing the light reflectance of said surface without substantially interfering with the light transmission of said article comprising a thin transparent metallic coating on said surface whereby the reflecting power of said surface is increased as compared with the uncoated surface of said article, the optical thickness of said metallic reflective coating being not more than one-hundredth of a wave length of light, the thickness and absorption of said transparent metallic reflective coating being such as not to substantially interfere with the light transmission of said article, and a transparent second coating over the surface of said metallic reflective coating, said second coating having an optical thickness of from approximately one-eighth to approximately three-quarters of a wave length of light with the thickness of said second coating depending upon the metal and thickness of which said metallic reflective coating is formed, said metallic reflective coating having a negligible optical path as compared with the optical path of said second coating and said second coating being of a non-metallic material and of a thickness to cooperatively function with said metallic reflective coating to thereby reduce the light reflection from said surface.

HAROLD OSTERBERG.